United States Patent
Eilers et al.

(10) Patent No.: US 12,195,110 B2
(45) Date of Patent: Jan. 14, 2025

(54) METHOD AND DEVICE FOR OPERATING A STEERING MECHANISM OF A MOTOR VEHICLE, AND CONTROL UNIT AND STEERING MECHANISM

(71) Applicant: ZF Friedrichshafen AG, Friedrichshafen (DE)

(72) Inventors: Hubertus Eilers, Hilter a.T.W. (DE); Caspar Lovell, Bad Essen (DE); Jochen Spiegelberg, Bissendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 564 days.

(21) Appl. No.: 17/600,713

(22) PCT Filed: Mar. 4, 2020

(86) PCT No.: PCT/EP2020/055720
§ 371 (c)(1),
(2) Date: Oct. 1, 2021

(87) PCT Pub. No.: WO2020/200616
PCT Pub. Date: Oct. 8, 2020

(65) Prior Publication Data
US 2022/0177029 A1 Jun. 9, 2022

(30) Foreign Application Priority Data
Apr. 5, 2019 (DE) ..................... 10 2019 204 913.3

(51) Int. Cl.
*B62D 5/04* (2006.01)
*B62D 7/14* (2006.01)

(52) U.S. Cl.
CPC ......... *B62D 5/0484* (2013.01); *B62D 5/0424* (2013.01); *B62D 5/0445* (2013.01); *B62D 7/148* (2013.01)

(58) Field of Classification Search
CPC .. B62D 5/0484; B62D 5/0424; B62D 5/0445; B62D 7/148; B62D 5/0469
See application file for complete search history.

(56) References Cited

U.S. PATENT DOCUMENTS 5,370,011 A  12/1994  Gilges et al.
5,596,252 A   1/1997  Shimizu et al.
(Continued)

FOREIGN PATENT DOCUMENTS

DE  41 27 487 A1  3/1993
DE  44 43 381 A1  6/1995
(Continued)

OTHER PUBLICATIONS

German Office Action Corresponding to 10 2019 204 913.3 mailed Feb. 12, 2020.
(Continued)

*Primary Examiner* — Kevin Hurley
*Assistant Examiner* — Marlon A Arce
(74) *Attorney, Agent, or Firm* — Finch & Maloney PLLC

(57) ABSTRACT

A method for operating a steering mechanism (12) of a motor vehicle, wherein a steering rod (27) can be held or displaced along its longitudinal axis (a) by an electric motor (22) so that the wheel steering angle (8, 9) of at least one wheel (5, 6) on at least one vehicle axle (1) can be maintained or changed. When a force ($F_{ext}$) acts essentially axially on the steering rod (27), displacement of the steering rod (27) is at least inhibited by a detent torque (RM) of the electric motor (22) and/or by a self-induced torque ($M_{sip}$) of the electric motor. The invention also relates to a device for carrying out the method and to a steering mechanism, which is preferably in the form of a steer-by-wire steering system. A control unit is provided for carrying out the method.

17 Claims, 3 Drawing Sheets

(56) References Cited

U.S. PATENT DOCUMENTS

| | | | | |
|---|---|---|---|---|
| 8,606,462 B2* | 12/2013 | Nakano | ................. | H02P 25/024 |
| | | | | 701/41 |
| 2003/0028304 A1 | 2/2003 | Klein et al. | | |
| 2003/0164060 A1* | 9/2003 | Menjak | ................. | B62D 5/006 |
| | | | | 74/552 |
| 2011/0127104 A1* | 6/2011 | Shibahata | ............. | B62D 5/001 |
| | | | | 180/446 |
| 2021/0086830 A1* | 3/2021 | Trautner | ............. | B62D 5/0421 |
| 2023/0109098 A1* | 4/2023 | Terashima | ........... | B62D 5/0478 |
| | | | | 701/41 |

FOREIGN PATENT DOCUMENTS

| | | |
|---|---|---|
| DE | 10 2007 000 594 A1 | 5/2009 |
| DE | 10 2010 042 329 A1 | 4/2012 |
| DE | 10 2010 043 970 A1 | 5/2012 |
| DE | 10 2012 105 143 A1 | 12/2013 |
| DE | 10 2017 217 073 A1 | 3/2019 |
| EP | 2 072 374 A2 | 6/2009 |
| JP | H09-301 200 A | 11/1997 |

OTHER PUBLICATIONS

International Search Report Corresponding to PCT/EP2020/055720 mailed May 18, 2020.
Written Opinion Corresponding to PCT/EP2020/055720 mailed May 18, 2020.

* cited by examiner

METHOD AND DEVICE FOR OPERATING A STEERING MECHANISM OF A MOTOR VEHICLE, AND CONTROL UNIT AND STEERING MECHANISM

This application is a National Stage application of PCT/EP2020/055720 filed Mar. 4, 2020, which claims priority from German patent application serial no. 10 2019 204 913.3 filed Apr. 5, 2019.

FIELD OF THE INVENTION

The invention relates to a method for operating a steering mechanism and a device for operating a steering mechanism of a motor vehicle, and to a control unit and a steering mechanism, according to the preambles of the independent claims.

BACKGROUND OF THE INVENTION

From DE 41 27 487 A1 a device for converting a rotation movement into a translation movement is disclosed. A drive unit comprises a driven step-down gear-train, which acts upon a mechanical transfer element in such a manner that a coaxial reduction gear designed to be self-inhibiting, relative to a retro-driving torque exerted by the transfer element, is provided, whereas the transfer element itself is not designed to be self-inhibiting. A force acting in the retro-driving direction, the direction of the translation movement, brings about no adjustment, since the step-down gear-train prevents that. In terms of design and layout, and also from the standpoint of cost, the effort and expenditure incurred by an additional step-down gear-train are not inconsiderable. An additional step-down gear-train also takes up fitting space and adds to the weight.

To prevent wandering of a steering rod, in the case of a faulty steering system, so that the wheel steering angle of the wheels coupled to the steering rod cannot unintentionally change, DE 10 2010 042 329 A1 proposes that the steering system prevents any axial displacement by means of a blocking element. Similarly to the above-mentioned prior art with an additional step-down gear-train, in the steering system shown in this case the blocking element can be regarded as an additional assembly. This again takes up fitting space, incurs additional costs and adds to the weight of the steering system.

SUMMARY OF THE INVENTION

The purpose of the present invention is to design a steering mechanism for a motor vehicle, which can overcome the aforesaid disadvantages of the prior art.

For this, a method and a device for operating a steering mechanism of a motor vehicle, and a control unit and a steering mechanism, according to the independent claims in combination with their characterizing features, are proposed. Preferred further developments are respectively indicated in the subordinate claims.

The invention first relates to a method for operating a steering mechanism of a motor vehicle, wherein a steering rod can be held or displaced along its longitudinal axis by means of an electric motor, so that the wheel steering angle, of at least one wheel on at least one vehicle axle, can be maintained or changed. The electric motor is coupled to the steering rod at least by means of a movement thread, so that when the electric motor rotates the steering rod is displaced in one direction or the other. At least in the retro-driving direction the movement thread has an efficiency characterized by at least less inhibition.

With a movement thread, the thread pitch can be chosen such that self-inhibition takes place. When a force acts on the steering rod essentially axially, i.e., essentially along or in the direction of its longitudinal axis, then, at least in the case of static loads, self-inhibition prevents the steering rod from moving. Thus, self-inhibition acts as a block. With dynamic loads, however, despite self-inhibition a displacement can take place—even in the drive direction and not only in the retro-drive direction. But if a movement thread with high efficiency is used, for example a spherical or roller thread, then the force acting essentially axially on the steering rod brings about a displacement of the steering rod in the retro-drive direction—i.e., against the drive direction. The result of the high efficiency is that such a movement thread, which is intended in this case, results in a slight inhibition but no self-inhibition. For example, due to friction in the movement thread and/or by virtue of the tribology within the movement thread, the low inhibition can depend on the lubricant used. Thus, as a result of its design, the movement thread can have at least a low inhibition, at least one that depends on the thread pitch. The lower the inhibition existing, the smoother is the movement thread and the higher is its efficiency. Correspondingly, less power is required for the steering. Having regard to the fitting space, a more compact drive motor can be used than with a movement thread whose efficiency is lower, such as a trapezoidal thread according to DIN 103.

In the case of a vehicle axle, wheels are arranged at the ends thereof, and a change in the wheel steering angle is applied to at least one axle in order to steer the vehicle. When driving straight ahead, depending on the designed or set toe-in or toe-out, the wheel steering angle is approximately zero degrees. Depending on an intentional drive around a curve or if the vehicle turns, the steering mechanism changes the wheel steering angle so that the vehicle can travel in the intended direction. During this, it is possible for the wheel steering angle to change at the front axle or at the rear axle or, however, at both axles or at further axles. For the vehicle to be able to follow the envisaged path, also called the trajectory, after it has been changed the wheel steering angle has to be maintained. To maintain a trajectory, the wheels basically have to be guided so that they will maintain the intended wheel steering angle. The wheels, which by means of wheel carriers on the vehicle body, are pivoted around their vertical axis, are guided by the steering mechanism and by means of control arms articulated to the steering mechanism. If now, during steering, the steering rod is displaced axially, i.e., along its longitudinal axis, this results in a change of the wheel steering angle of the wheel concerned. After the change of the wheel steering angle, the changed wheel steering angle is maintained by virtue of the guiding of the wheels. The displacement of the steering rod can be produced by an electric motor if its rotation axis is coupled to the steering rod directly or indirectly via a pinion or gearwheel.

In a motor vehicle, lateral forces act upon the respective wheels depending on the route traveled. For example, when driving straight ahead, lateral forces are rather small and are determined by dynamic influences such as the surface or condition of the road, or side-winds. In contrast, when driving round a curve, for example, in the case of a curve to the left, the wheels are steered to the left and this produces high transverse forces that act upon the wheel and the wheel carrier. Without guiding, the wheel steering angle would change in an uncontrolled manner. To guide the wheel, these lateral forces have to be absorbed by the control arms and the steering rod of the steering mechanism. To support the steering mechanism, it is, in turn, connected via a subframe or directly to the vehicle body. During normal operation of the steering mechanism, the electric motor can be switched on or energized in such a manner that it produces a counter-torque by way of a position regulation system, so that a displacement of the steering rod, owing to the lateral force acting via the wheels, can be prevented. Thus, the wheel steering angle is set by means of the steering rod. This is achieved, for example, by a position-regulating system, so that the holding torque of the electric motor, determined by a sensor, is kept large enough to prevent a change of the wheel steering angle at the wheels, both when driving straight ahead and when driving round a curve. In other words, the electric motor is controlled so as to maintain the position of the steering rod.

In the event of a fault, i.e., for example, if the power supply to the electric motor is interrupted or has failed, safety provisions must be in place to prevent axial displacement of the steering rod due to lateral forces. In other words, when a lateral force is exerted because of driving round a curve, it must be ensured that the steering rod cannot move axially independently, or only so to a permitted extent, i.e., within a narrow tolerance range, so that the vehicle remains controllable. If the displacement of the steering rod is not at least inhibited, or even completely blocked, an uncontrollable driving condition can arise owing to random changes of the wheel steering angle of the wheels. This is particularly the case with a steering mechanism that comprises a movement thread having high efficiency. A movement thread with high efficiency exists, for example, in the case of a ball thread drive, which shows, at least, a little self-inhibition.

When a lateral force acts on a wheel, a retro-drive force acts on the steering rod so that owing to the movement thread, a counter-torque or torque opposed to the drive torque is produced on the electric motor. The movement thread can consist, for example, of a gearwheel which rotates about its rotation axis and engages with a steering rod in the form of a rack-bar. Thus, when the gearwheel rotates the steering rod is axially displaced. With a self-inhibiting movement thread, the gearwheel and the teeth of the rack-bar are designed such that when a force acts upon the rack-bar, a rotation of the pinion or gearwheel is not possible. This is also understood to be mechanical self-inhibition in the case of movement threads. The rack-bar can also be in the form of a spindle with its external thread engaged with a positionally fixed spindle nut which has an internal thread. However, a movement thread has only low efficiency. This is the case, for example, when the movement thread is made with a worm gear or a trapezoidal thread.

However, the object of the present invention assumes a movement thread with high efficiency, i.e., high efficiency with at least a little self-inhibition. Besides a ball thread drive, as a rule this is also the case with a roller thread drive. Owing to the at least slight self-inhibition, i.e., in other words little or even no self-inhibition, a lateral force or force action, exerted essentially in the direction of the longitudinal axis of the steering rod, would bring about a displacement of the steering rod. In other words, in the event of a fault, the undesired displacement of the steering rod and hence the uncontrolled wheel steering angle changes of the wheels would take place at the respective steered vehicle axle.

The present invention provides that when an essentially axial force acts upon the steering rod, a displacement of the steering rod is at least inhibited. In other words, the displacement is only permitted to a limited extent and/or is even completely inhibited or blocked. For this, the detent torque of the electric motor is used and, in addition or instead, a torque induced by the electric motor itself is used. As already said earlier, the displacement of the steering rod, due to a lateral force on the wheels, produces an opposing torque on the electric motor owing to the coupling of the electric motor by means of the movement thread. A torque to inhibit the axial displacement of the steering rod must, accordingly, be large enough to inhibit or block rotation of the electric motor. The rotation moment, also called the torque, consisting of the detent torque and/or a self-induced torque of the electric motor, can be designed to fit the needs concerned.

The invention relates, above all, to the normal use of the steering mechanism. This means that the intended inhibition does not include any loads caused by misuse. For example, in a hard drive up a curb (curb bump) lateral forces unusually high for normal operation occur, which are also known as special-event loads. With these high loads, an inhibition is rather counterproductive, since an inhibition is then undesired because even greater damage to wheel-guiding chassis components (such as track-rod joints) would occur. Such high loads bring about lateral forces which, for example, are more that twice as large as the maximum lateral forces to be expected during the normal operation of the vehicle.

As the detent torque, also called in English the cogging torque, a property of electric motors is meant which exists owing to the use of permanent magnets in the stator and a grooved armature made of electrical sheet-metal, or conversely. In motors which are grooved both in the stator and the armature, detent torques also occur during operation. Due to the change of the air-gap on passing from an armature body to an armature groove opposite the permanent magnet, the magnetic resistance changes and so too does the force on the armature. Simply put, the effect of this is that, owing to the detent torque, the rotor remains in certain positions when the motor has been switched off. Thus, at rest (i.e., even when de-energized) the motor is characterized by its design-determined detent torque. The invention makes use of that torque as if it were a counter-torque which acts in opposition to the torque produced by the movement thread due to the action of force on the steering rod. In other words, in the event of a fault, for example when no power is delivered to the steering mechanism, a counter-torque is maintained by the detent torque of the electric motor, which is then available. This quasi-passive existing detent torque produces a holding force which is directed in opposition to the force acting essentially axially on the steering rod. The rotation of the motor is thus impeded so that in the event of a fault, owing to the coupling by means of the movement thread, the steering rod is not displaced. Thus, the detent torque replaces the self-inhibition. The electric motor can be designed having regard to a required detent torque.

In addition or alternatively to the inhibition or blocking of the electric motor, a self-induced torque of the electric motor is used. The self-induced torque is preferably produced by an at least temporary phase short-circuit at the electric motor phases. With open phases, after overcoming its detent torque, the electric motor can rotate virtually freely. If the phases of the electric motor are short-circuited, then, as the rotation of the electric motor begins, an opposing torque is built up, the so-termed self-induced torque. In other words, with short-circuited phases, owing to the counter-torque produced as soon as the motor axle begins to rotate, the motor can only be rotated very little. The invention makes use of that property so that, with an at least temporary phase short-circuit, the axial displacement of the steering rod is at least impeded or even blocked, when there is a force acting essentially axially on the steering rod, for example due to lateral forces acting on the wheels.

Alternatively or in combination with the detent torque of the electric motor, it is therefore possible effectively to at least inhibit or completely block the displacement of the steering rod. Alternatively to switching the phase short-circuit directly in the motor phases (=an actual short-circuit), this can be produced with an interposition of resistors or transistors. If transistors are used, so-termed field-effect transistors (FETs) can be used, which can be used as variable resistances. The inhibition or self-induced torque can then be adjusted or adapted having regard to the lateral forces to be expected. A temporary phase short-circuit is understood to be a pulsed phase short-circuit, i.e., the phase short-circuit is switched on at time intervals or cyclically.

In a preferred embodiment, the electric motor phases are connected in such a manner that the phase short-circuit in the electric motor phases is formed if there is a fault in the steering mechanism, preferably if the supply voltage fails, so that the displacement of the steering rod is at least inhibited. When the supply voltage is present, the phases of the electric motor are kept open. The voltage supply is normal, so that the electric motor can drive the steering mechanism in the normal way. If a temporary or total failure of the supply voltage takes place, a phase short-circuit at the electric motor phases is automatically produced. This can be done, for example, by means of an electromagnetically opened relay, which owing to the spring pre-loading of the relay contacts, produces a phase short-circuit at the electric motor phases if the supply voltage drops. Alternatively FETs with privileged positions can be used, which can also switch in a phase short-circuit if the supply voltage drops or fails. In that way passive maintenance of the phase short-circuit, in the electric motor phases, is ensured so that immediately after a drop or failure of the supply voltage, the displacement of the steering rod is at least inhibited.

In a preferred embodiment, the electric motor is controlled by a control unit designed such that, in the event of a failure of the supply voltage, the control unit enables a short-circuit of the phases of the electric motor. Preferably, it is provided that the control unit also produces a phase short-circuit when the motor is at rest. This ensures that even if a fault occurs, only after the steering mechanism has been reactivated, the displacement of the steering rod is at least inhibited. The said fault can occur both in the control system or control unit also as due to a failure or insufficiency of the supply voltage. The fault can also occur due to failure of electrical components in the electric motor or the control unit or a bus system, such as the CAN bus, when a steering mechanism is used in a vehicle, whose control unit operates the steering mechanism.

Preferably, the phase short-circuit is only switched in when a tolerated displacement of the spindle is exceeded. To be able to set the appropriate wheel steering angle, in steering systems it is usual for the position of the steering rod to be detected by means of a suitable sensor system. Here, for example, contactless Hall sensors or the sensor system of the electric motor can be used. If, in the case of particular vehicles or requirements relating to particular journeys, such as driving in a sporty mode or in an off-road mode, a certain wheel steering angle change and hence a displacement of the spindle is only permitted within narrow limits, it is advantageous if the phase short-circuit is only switched in after a particular displacement of the spindle, i.e., a so-termed tolerated displacement of the steering rod has taken place. For example, the control unit would recognize a displacement of the steering rod by a few milli-meters, such as 5 to 15 mm, and once that threshold has been reached, the unit would switch in the phase short-circuit in the electric motor phases in order at least to inhibit, or to completely block any further displacement.

In a further embodiment, it is provided that after a tolerated displacement with initial inhibition a block of the displacement of the steering rod takes place. In contrast to the above-described embodiment, in this case the further displacement of the steering rod is already inhibited by a temporary phase short-circuit when the displacement begins. Depending on the vehicle or the driving situation, it can in that way be ensured that the steering mechanism is only blocked after a certain tolerated wheel steering angle change, so that, thereafter, no further change of the wheel steering angle takes place.

Preferably, the method is carried out as a function of parameters of the steering mechanism. The parameters can include at least the detent torque of the electric motor and/or the self-induced torque of the electric motor when there is a phase short-circuit and/or the efficiency of the movement thread and/or a transmission gear ratio when an intermediate transmission is used. For example, an intermediate transmission exists when the electric motor or its drive axle is provided with a belt pinion that drives a pulley-wheel by means of a toothed belt. The pulley wheel, in turn, is coupled to a spindle nut or a gearwheel which engages with the teeth or thread of the steering rod. Furthermore, the torque produced due to the force that acts essentially axially on the steering rod, and/or the instantaneous axial displacement of the steering rod, can also be taken into account. In addition, parameters such as the temperature in the spindle drive in relation to a possible adjustment speed of an actuator for operating the steering mechanism, and the external temperature at the time having regard to the tribology of the system as a whole, can be taken into account in order to bring about the inhibition or blocking. For example, at low temperatures the efficiency of the movement thread decreases because the lubricant used in the movement thread becomes more viscous. This can be added to the detent torque. Thus, the force acting on the steering rod can be larger without an opposing torque being produced by the movement thread on the electric motor. The inhibition or blocking of the displacement of the steering rod is influenced by the parameters mentioned here, which are not listed exhaustively.

The invention also relates to a control unit for carrying out a method for operating a steering mechanism in accordance with the above description. The said control unit can be in the form of a separate device, i.e., an individual control unit. Alternatively, the method can be carried out using a control unit present in a motor vehicle. The method can be carried out by means of program codes on a computer unit. The computer unit can be part of the control unit. The aforesaid parameters can be determined by means of suitable sensors and stored by the control unit. The data determined can be taken into account by the computer unit via the program codes when switching in the phase short-circuit.

The invention also relates to a device for operating a steering mechanism of at least one axle of a motor vehicle with a steering rod, wherein an electric motor is coupled to the steering rod at least by way of a movement thread in order to move the rod along its longitudinal axis, and wherein the movement thread has an efficiency with at least low self-inhibition. The device can be designed as an actuator that can displace the steering rod along its longitudinal axis. The steering rod can be part of the actuator. An actuator can be provided for each wheel, which can change the wheel steering angle of the wheel concerned. Alternatively, a centrally operating actuator can be provided, which is fixed on the auto body or vehicle structure and in which the steering rod can be displaced axially in one or the other direction in order to change the wheel steering angle of at least two wheels at the same time. The device or actuator can have a housing in which a spindle nut, as part of the movement thread, is arranged positionally fixed and can be driven by the electric motor. By rotating the positionally fixed spindle nut, its rotation movement is converted by a spindle with an external thread into a translational movement. As mentioned earlier, there can be teeth on the steering rod in which a pinion engages, which pinion is connected to the axle of the electric motor. When the gearwheel is rotated, the steering rod or toothed rod is moved in one direction or the other in order to be able to bring about a change of the wheel steering angle.

The device is characterized in that when a force acts essentially axially on the steering rod, the displacement of the steering rod can be at least inhibited by virtue of a detent torque of the electric motor and/or a self-induced torque of the electric motor. As already mentioned in connection with the method, the device or actuator can advantageously enable the displacement of the steering rod and hence the change of wheel steering angle to be inhibited.

In a preferred embodiment, the device or actuator comprises a spindle drive wherein the steering rod is in the form of the spindle and a spindle nut is positionally fixed in the spindle drive and is directly coupled, or via an intermediate transmission, to the electric motor so that when the spindle nut is rotated, the spindle moves along its longitudinal axis.

In an alternative embodiment, the steering rod is in the form of a rack-bar in which a gearwheel engages, the said gearwheel being coupled to the electric motor, so that when the electric motor rotates, the rack-bar is displaced along its longitudinal axis in the appropriate direction, depending on the rotation direction of the electric motor.

Finally, the invention relates to a steering mechanism which comprises a device as described above. The steering mechanism comprises at least one steering rod, which is connected to the wheel carriers of a vehicle axle directly or with the interposition of further control arms such as a two-point control arm. The steering rod has to be displaced axially in order to produce a change of the wheel steering angle. The device or actuator constitutes the drive for the axial displacement of the steering rod. A possible design of the steering mechanism is described in the description of an example embodiment given below.

The steering mechanism is preferably in the form of a steer-by-wire steering system. A steer-by-wire steering system is a mechanically decoupled steering device in which the change of the wheel steering angle is not brought about by a mechanical connection to the manual steering device, for example a steering wheel. The adjustment movement of the steering wheel is converted into an electric adjustment signal and, for example, sent to a control unit. The control unit then controls the actual system components, i.e., in the present case the actuator, electrically. Ultimately, the steering movement is not transmitted by any mechanical connection, just "by wire", i.e., by means of a cable or sometimes even by wireless means. The steering movement of a steer-by-wire system can even take place without any input from the driver or the manual steering device. For example, in at least partially autonomously driving vehicles the steering can take place purely by means of one or more control units as a function of data and parameters which exist or have been determined inside or outside the vehicle. For that purpose environmental data can be used, for example car-to-car (c2c) and/or car-to-X (c2X) and/or cloud-based data, which are processed by a control unit of the vehicle.

BRIEF DESCRIPTION OF THE DRAWINGS

Below, the invention will be described with reference to preferred embodiments relating to the drawings, which show.

DETAILED DESCRIPTION OF THE PREFERRED EMBODIMENTS

Figure 1:
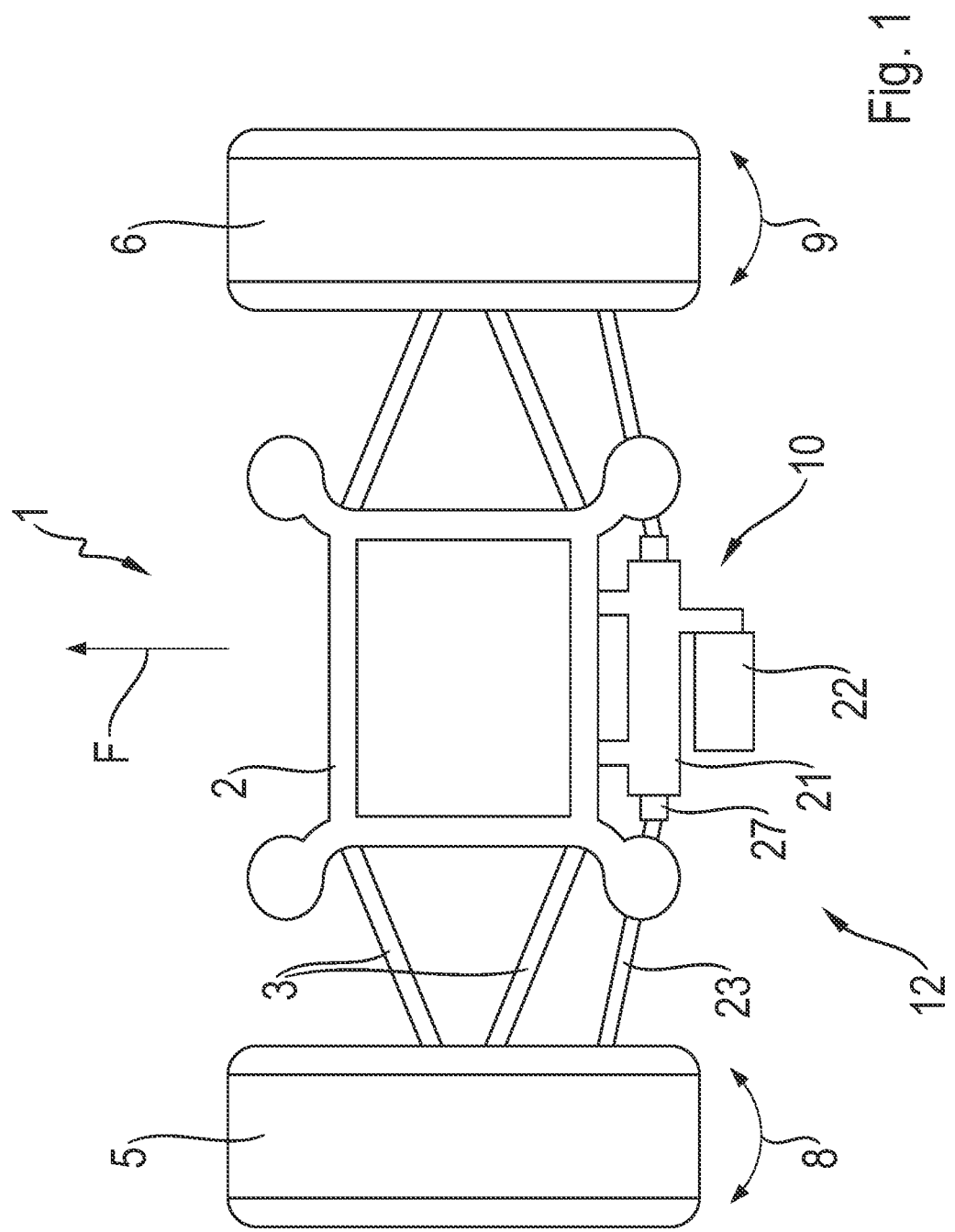
FIG. 1: A schematic view from above, of a rear axle of a vehicle.

In the schematic representation shown in FIG. 1, a vehicle axle 1 is shown, in this case represented as a rear axle with a subframe 2 which can be fixed to a vehicle body or which forms the latter and is connected to the body of a motor vehicle. However, the invention is not limited to a rear axle. The wheels 5 and 6 are articulated to the subframe 2 by means of control arms 3. The control arms 3 are part of the wheel suspension of the wheels 5, 6. An actuator 10 of a steer-by-wire system 12 is arranged on the subframe 2. The actuator 10 with its housing 21 is attached to the subframe 2. In this embodiment, the actuator 10, as a central actuator, comprises a through-going steering rod 27 which extends through the housing 21 of the actuator 10. The drive motor 22 is arranged axis-parallel to the steering rod 27. To the ends of the steering rod 27 are articulated track-rods 23, which at the ends remote from the actuator 10 are, in each case, articulated to the wheel carriers (not shown) of the wheels 5 and 6. Clearly, an axial displacement of the steering rod 27, i.e., a displacement along the longitudinal axis a in one direction or the other, will result in a change of the wheel steering angle 8, 9, because the track rods form a positive connection between the actuator 10 and the wheel 5, 6 or its wheel carrier. To steer the wheels 5, 6 they are articulated on the wheel suspension 3 about their vertical axis. In other words, the actuator 10 is a device that enables the steering mechanism 12 to be operated.

Figure 2:
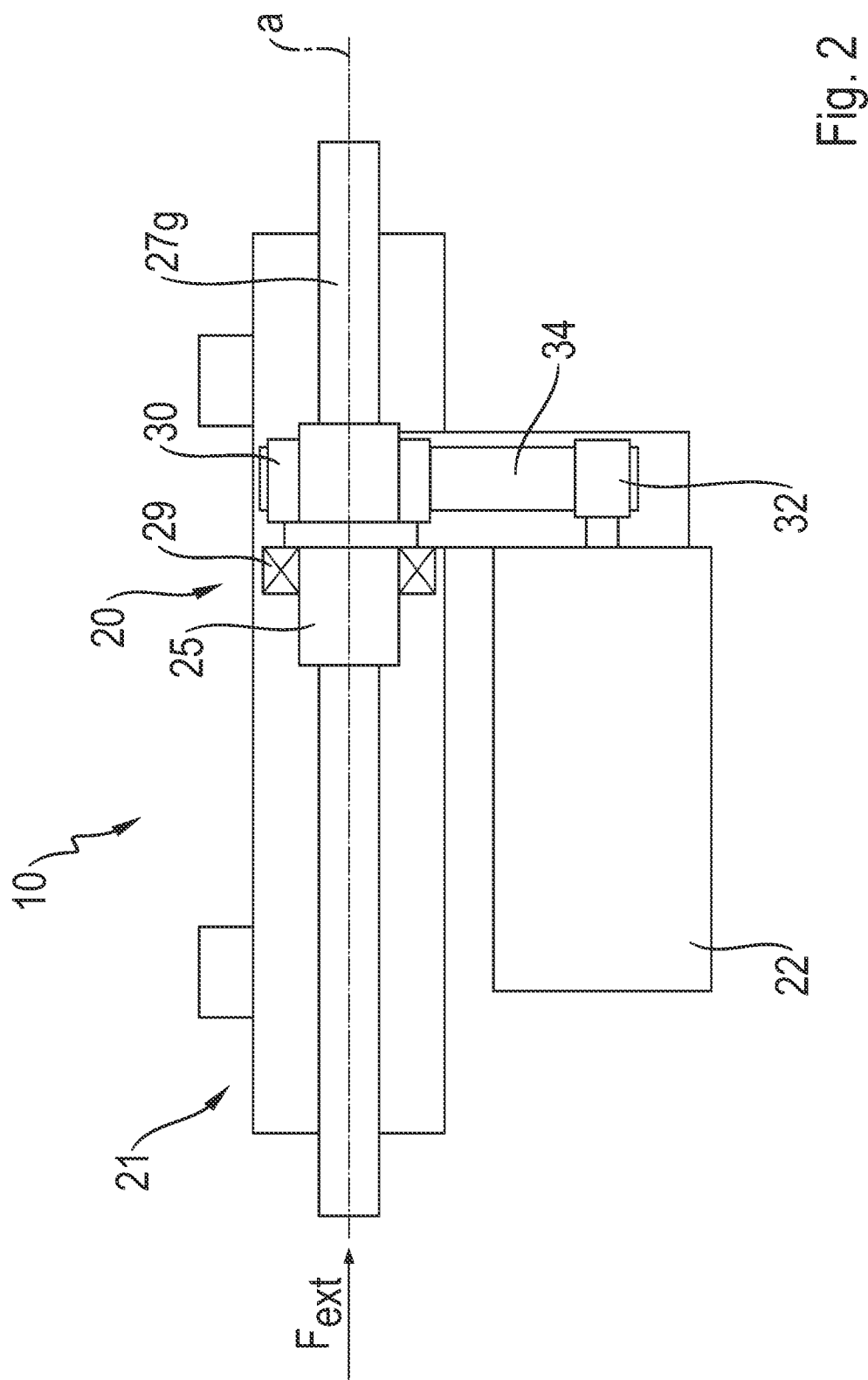
FIG. 2: A schematic view of a device for operating a steering mechanism.

FIG. 2 shows a schematic representation of the actuator 10 already shown in FIG. 1. The actuator 10 comprises a housing 21 on which a drive motor 22 with its parallel axis is arranged. The spindle drive 20, which consists of the spindle nut 25 and the steering rod 27 in the form of a threaded spindle, is arranged in the housing 21. Relative to the housing 21, the spindle nut 25 is arranged in a fixed position but able to rotate by virtue of a roller bearing 29. Passing through the spindle nut 25 and arranged coaxially with it is the threaded spindle 27g. On the side of the side of the spindle nut 25, facing away from the roller bearing 29, a pulley wheel 30 is arranged rotationally fixed on the spindle nut 25. The electric motor 22 has a drive pinion 32. A drive belt 34, in the form of a toothed belt, passes around both the drive pinion 32 and the pulley wheel 30, so that when the electric motor or drive motor 22 rotates, the spindle nut 25 also rotates without slip about its longitudinal axis a. The drive pinion 32, the pulley wheel 30 and the drive belt 34 form an intermediate transmission. Depending on the rotation direction of the spindle nut 25, a linear displacement of the steering rod 27 takes place in one direction or the other along the longitudinal axis a. With a force $F_{ext}$ acting essentially axially on the steering rod 27, the spindle nut 25 will rotate so that, owing to the said force $F_{ext}$, a torque is produced. Thus the electric motor too will rotate with it, and an axial displacement of the steering rod 27 in the retro-drive direction can take place unless measures, according to the invention, oppose that. This is particularly undesirable in the event of a fault, for example when the actuator is de-energized, and that condition can result in uncontrolled wheel steering angle changes.

Figure 3:
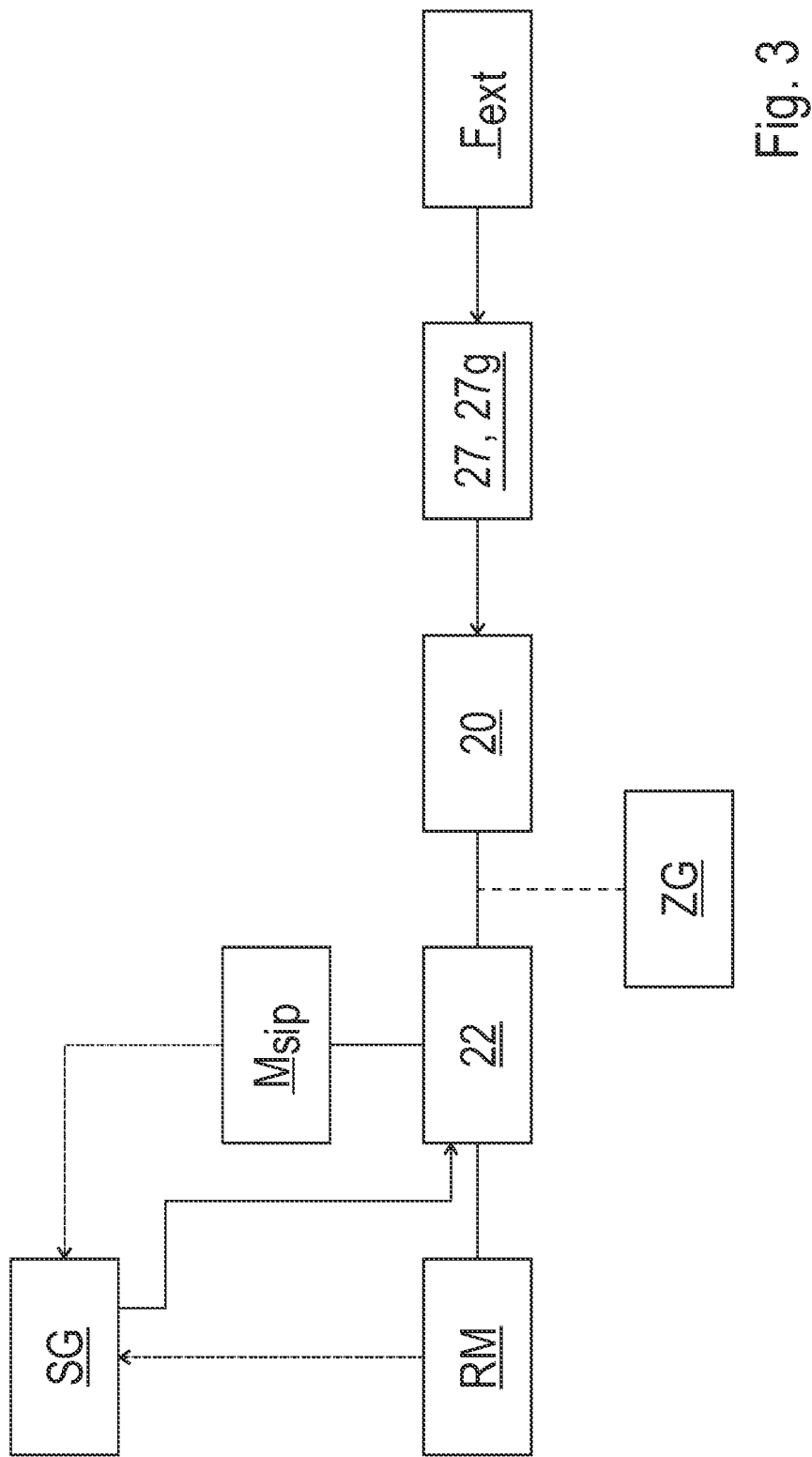
FIG. 3: A schematic representation of an example embodiment of the invention (method).

FIG. 3 shows a schematic representation of a possible embodiment of the method for operating a steering mechanism. An electric motor 22 has a detent torque RM and a self-induced torque Msip. The electric motor or its phases are controlled or switched by a control unit SG. In the control unit, the properties of the electric motor, among other things, are stored in the form of the detent torque RM and the self-induced torque Msip. If now an external force Fext acts upon the steering rod 27, then, depending on the efficiency of the movement thread 20 in the retro-drive direction, a torque is produced. This torque acts upon the electric motor 22 directly, or indirectly if an intermediate transmission 34 in the form of a belt transmission is used. If the movement thread 20 consists of a steering rod 27 in the form of a rack-bar and a gearwheel that engages in the rack-bar, which gearwheel is connected to the axle of the electric motor 22, then the torque acts directly on the electric motor 22. This is also the case when the movement thread consists of a threaded spindle 27 g surrounded by a spindle nut 25 if the spindle nut 25 is coupled to the axle of the electric motor 22, as in the embodiment shown in FIG. 2.

Alternatively, the electric motor 22 can be designed as a hollow-shaft motor instead of a coaxial motor, so that in the hollow-shaft motor case the rotor of the electric motor 22 forms the spindle nut 25, such that when it rotates, the spindle 27 g moves axially in one direction or the other. If necessary, an anti-rotation device is used so that the spindle itself does not rotate relative to the housing 21. Here an indirect connection, when mentioned, means that the gearwheel or the spindle nut 25 is coupled to the electric motor 22 by way of an intermediate transmission 34.

The detent torque of the electric motor 22 provides a counter-torque to the torque produced by the external force $F_{ext}$ and the movement thread 20, if necessary with interposition of the intermediate transmission. So long as the torque produced by the movement thread is higher than the detent torque of the electric motor 22, a displacement of the steering rod is inhibited or blocked. If there is a phase short-circuit in the phases of the electric motor, for example, switched in by the control unit SG in the event of a fault, then when the detent torque RM is exceeded the axle of the electric motor 22 begins to rotate and a self-induced torque $M_{sip}$ is produced. Thus, if the detent torque RM is overcome by the counter-torque in the retro-drive direction produced by the movement thread 20 owing to the external force $F_{ext}$, then as soon as the axle of the electric motor begins to rotate, the self-induced torque $M_{sip}$ builds up and inhibits or blocks the displacement of the steering rod 27. Advantageously therefore, when the external force $F_{ext}$ is exerted, the axial displacement of the steering rod 27 is immediately inhibited or blocked. In this, the manner or extent of the inhibition can be controlled by the control unit by temporarily switching in the phase short-circuit or by means of resistances (FET).

INDEXES

1 Vehicle axle
2 Subframe, vehicle body
3 Control arm, wheel suspension
5 Wheel
6 Wheel
8 Wheel steering angle
9 Wheel steering angle
10 Actuator
12 Steering mechanism
20 Movement thread
21 Housing
22 Drive motor, electric motor
23 Track rod
25 Spindle nut
26 Internal thread
27 Steering rod
27g Threaded spindle, spindle
29 Roller bearing
30 Pulley wheel
32 Drive pinion
34 (Toothed) belt
a Longitudinal axis
SG Control unit

The invention claimed is:

1. A method for operating a steering mechanism of a motor vehicle, wherein a steering rod can be held at rest or is displaced along a longitudinal axis by an electric motor, so that a wheel steering angle of at least one wheel, on at least one vehicle axle, can be maintained or changed, the method comprising:
coupling the electric motor to the steering rod at least by a movement thread,
designing the movement thread, at least in a retro-drive direction, to have an efficiency that corresponds to slight inhibition, and
when a force, which is greater than the inhibition provided by the design of the movement thread, acts substantially axially on the steering rod, then using at least one of a detent torque of the electric motor and/or a self-induced torque of the electric motor to inhibit displacement of the starring rod.

2. The method according to claim 1, further comprising only switching on the phase short-circuit if a tolerated displacement of the steering rod is exceeded.

3. The method according to claim 1, further comprising, after permitting a tolerated displacement with initial inhibition, blocking further displacement of the steering rod.

4. The method according to claim 1, further comprising carrying out the method with a control unit as a function of parameters of the steering mechanism, wherein the parameters include at least one of:
the detent torque of the electric motor,
the self-induced torque of the electric motor when there is a phase short-circuit,
an efficiency of the movement thread,
the torque produced due to the substantially axial force acting on the steering rod, and
an instantaneous axial displacement of the steering rod.

5. The method according to claim 4, further comprising carrying out individual steps, or all the steps of the method, by program code on a computer unit which is part of the control unit, wherein the parameters are determined by suitable sensors and stored by the control unit.

6. A control unit for carrying out a method for operating an actuator or a steering mechanism according to claim 1.

7. A method for operating a steering mechanism of a motor vehicle, wherein a steering rod can be held at rest or is displaced along a longitudinal axis by an electric motor, so that a wheel steering angle of at least one wheel, on at least one vehicle axle, can be maintained or changed, the method comprising:
- coupling the electric motor to the steering rod at least by a movement thread,
- designing the movement thread, at least in a retro-drive direction, to have an efficiency that corresponds to slight inhibition,
- when a force acts substantially axially on the steering rod, at least inhibiting displacement of the steering rod by a detent torque of the electric motor and/or by a self-induced torque of the electric motor, and
- bringing about the self-induced torque by an at least temporary phase short-circuit of phases of the electric motor.

8. The method according to claim 7, further comprising connecting the phases of the electric motor in such a manner that the phase short-circuit of the phases of the electric motor occurs if there is a fault in the steering mechanism so that the displacement of the steering rod is at least inhibited.

9. A device for operating a steering mechanism of at least one wheel on at least one vehicle axle of a motor vehicle, the device comprising:
- a steering rod,
- wherein an electric motor is coupled, by way of a movement thread, to the steering rod in order to move the steering rod along a longitudinal axis,
- the movement thread has an efficiency that corresponds to at least slight inhibition,
- when a force, which is greater than the inhibition provided by the design of the movement thread, acts substantially axially on the steering rod, then using at least one of a detent torque of the electric motor or a self-induced torque of the electric motor to inhibit displacement of the starring rod.

10. The device according to claim 9, wherein the steering rod is in a form of a spindle, and a spindle nut is fitted in a fixed position in the device and is coupled to the electric motor so that when the spindle nut rotates, the spindle is displaced along its longitudinal axis.

11. The device according to claim 9, wherein the steering rod is in a form of a rack-bar with which a gearwheel engages, the gearwheel is coupled to the electric motor so that when the gearwheel rotates, the rack-bar is displaced along its longitudinal axis.

12. A steering mechanism including the device according to claim 9.

13. A steering mechanism including the device according to claim 10.

14. A steering mechanism including the device according to claim 11.

15. The steering mechanism according to claim 12, wherein the steering mechanism is in a form of a steer-by-wire steering system on a rear axle.

16. The steering mechanism according to claim 13, wherein the steering mechanism is in a form of a steer-by-wire steering system on a rear axle.

17. The steering mechanism according to claim 14, wherein the steering mechanism is in a form of a steer-by-wire steering system on a rear axle.

* * * * *